United States Patent [19]

Rhodes

[11] Patent Number: 4,932,807
[45] Date of Patent: Jun. 12, 1990

[54] CLEVIS JOINT FOR DEPLOYABLE SPACE STRUCTURES

[75] Inventor: Marvin D. Rhodes, Yorktown, Va.

[73] Assignee: The United States of America as represented by the Administrator of the National Aeronautics and Space Administration, Washington, D.C.

[21] Appl. No.: 225,427

[22] Filed: Jul. 28, 1988

[51] Int. Cl.⁵ .............................................. F16C 11/00
[52] U.S. Cl. .................................... 403/147; 403/146; 403/156; 403/334
[58] Field of Search ............... 403/156, 157, 161, 162, 403/146, 147, 159, 149, 154, 334

[56] References Cited

U.S. PATENT DOCUMENTS

| | | |
|---|---|---|
| 227,393 | 5/1880 | Stanhope, Jr. . |
| 446,005 | 2/1891 | Paul . |
| 1,153,986 | 9/1915 | Whitney . |
| 2,344,808 | 3/1944 | Duffield et al. ................ 403/146 X |
| 2,463,124 | 3/1949 | Sims .................................... 403/334 |
| 2,553,158 | 5/1951 | Zillman . |
| 2,621,950 | 12/1952 | Ricks ............................... 403/161 X |
| 4,491,436 | 1/1985 | Easton ............................. 403/154 X |
| 4,653,951 | 3/1987 | Bodle et al. ..................... 403/149 X |
| 4,747,724 | 5/1988 | Nishikawa et al. ............. 403/147 X |

FOREIGN PATENT DOCUMENTS 1925794 11/1970 Fed. Rep. of Germany ...... 403/145

*Primary Examiner*—Peter M. Cuomo
*Attorney, Agent, or Firm*—George F. Helfrich; John R. Manning; Charles E. B. Glenn

[57] ABSTRACT

A zero-play pin clevis joint for deployable space structures includes a tapered pin and tapered bores extending through a shackle and through a tang such that the tapered pin is received in the tapered bores. Spring washers urge the tapered pin into the tapered bores of the shackle and also urge the tang onto the tapered pin. Deployable truss structures use a plurality of the aforementioned zero play pin clevis joints to connect a plurality of truss tubes. The angle of taper for the various components is preferably about 12° included angle.

20 Claims, 1 Drawing Sheet

४,९३२,८०७

CLEVIS JOINT FOR DEPLOYABLE SPACE STRUCTURES

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION 1. Field of the Invention

The present invention relates generally to clevis joints, and more specifically, to zero free play pin clevis joints for deployable space structures. 2. Description of the Related Art Deployable truss structures have myriad uses in outer space, such as the construction of space stations, platforms, etc. A multibay deployable truss structure may have hundreds of pin clevis-type joints that must move with low friction for the truss to deploy reliably.

Pin clevis joints are generally known and usually include a U-shaped shackle attached to an end of a structural member and having its ends drilled to receive a cylindrical pin or bolt. A projecting shank or tang provided at the end of another structural member is provided with a hole usually of the same diameter as the drilled portion of the U-shaped shackle. The tang is then inserted between opposite sides of the shackle such that when the hole in the tang is aligned with the drilled portion of the shackle, the pin passes through the shackle and tang to unite the two ends of the structural members.

Pin clevis-type joints used in deployable space structures have a problem associated with clearance between the pin and the clevis holes. This clearance leads to free-play in the joint. A deployable truss structure having hundreds of pin clevis-type joints experiences an accumulation of free-play along its length. Free-play degrades the ability to position the structure accurately, and makes structural stiffness difficult or impossible to predict. These conditions can make surface control and position control impossible using conventional sensors and controls.

As an example of the difficulty required in fabricating space-quality deployable beam hardware, an 18-bay deployable beam structure was fabricated by NASA for laboratory test purposes. The beam had over 375 pin clevis-type joints. To alleviate the problem of joint free-play, the pins and holes of the joints were machined to tolerances in the range of 0.0002 inches, and the pins were hand picked to match the hole size and pressed into the joint members. Therefore, the existing solution to the free-play problem is expensive and highly labor intensive, and therefore, impractical.

The problem of free-play is critical in space applications and other applications involving precision machinery in which zero free play is required, such as precision robotic machines. However, the problem is most critical to space structures which require multiple joints, in which free-play, which may be very slight in one joint, is multiplied perhaps several hundred times.

SUMMARY OF THE INVENTION

An object of the invention is to provide pin clevis joints for deployable space structures in which the joints have zero free-play.

Another object of the invention is to provide deployable space structures which are relatively inexpensive to assemble and less labor intensive than existing structures.

Another object of the invention is to provide a pin clevis joint for deployable space structures which does not require precision machining and/or hand picked and matched pins for shackle and tang holes.

In a preferred embodiment of the invention, a pin clevis joint for deployable space structures includes a substantially U-shaped shackle connected to an end of a first structural member, the shackle having two opposite side, axially extending projections. A tapered bore extends transversely through the two projections of the shackle and forms two conically shaped and aligned surfaces in the two projections of the shackle. An axially extending tang is connected to an end of a second structural member and has a tapered bore extending transversely therethrough, the tapered bore forming a conically shaped surface in the tang. The tang is fitted between the two projections of the shackle such that the conically shaped surfaces of the two projections and the tang are aligned. A pin has a headed end and an opposite end and a conically shaped sidewall between the headed and opposite ends. The conically shaped sidewall has an angle of slope equal to the angle of slope for the conically shaped surfaces of the two projections of the shackle and the tang. The pin passes through the tapered bores of the tang and shackle and fits precisely therein with zero freeplay. A fastener is connected to the opposite end of the pin. First spring means biases the tang onto the sidewall of the pin and a second spring means biases the pin onto the conically shaped surfaces of the two projections of the shackle. Preferably, the spring means are curved spring washers.

These objects, together with other objects and advantages which will be subsequently apparent reside in the details of construction and operation of the apparatus as more fully hereinafter described and claimed, reference being had to the accompanying drawings forming a part hereof, wherein like reference numerals refer to like parts throughout.

Figure 1:
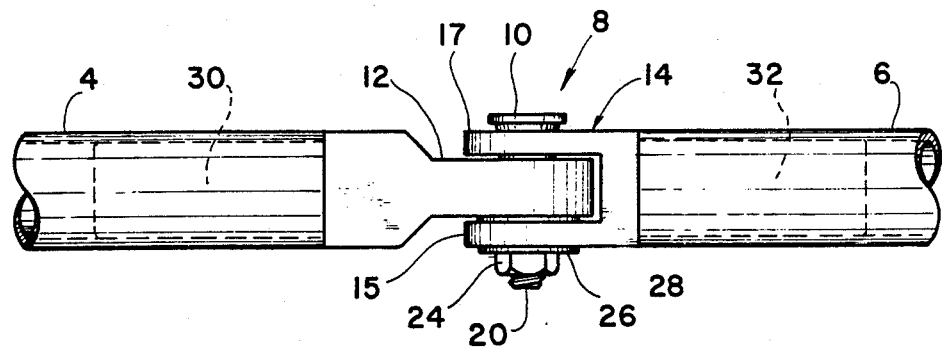
FIG. 1 is a longitudinal, cross-sectional view of a first, preferred embodiment of the present invention.

FIG, 2 is a side elevation view of the embodiment of FIG. 1; and

Figure 3:
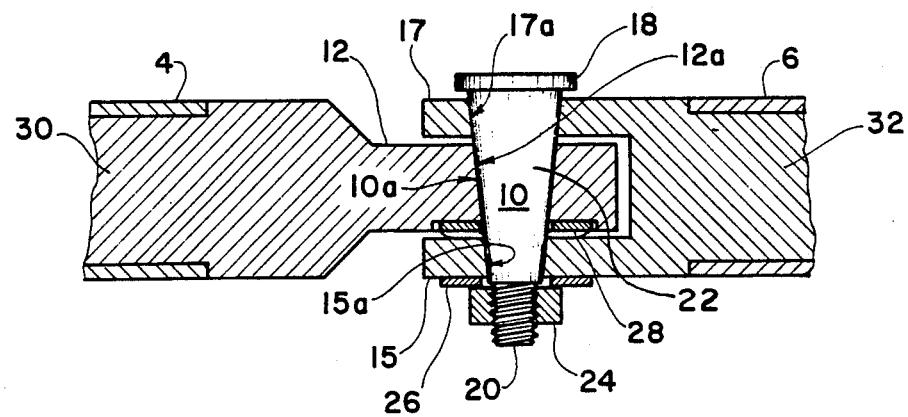

FIG. 3 is a detailed, cross-sectional view of the embodiment of FIG. 1.

DETAILED DESCRIPTION OF THE PREFERRED EMBODIMENTS

Figure 2:
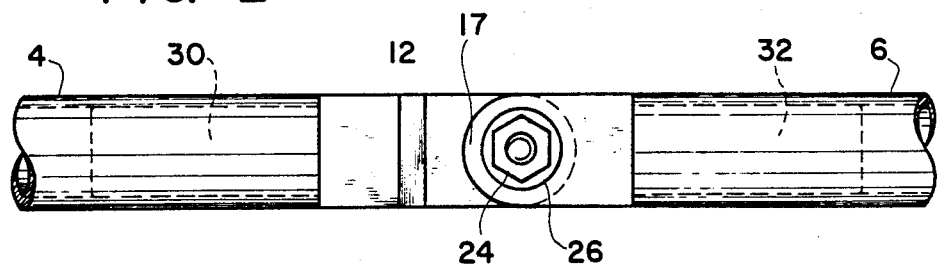

Referring to FIGS. 1-3, truss tubes 4 and 6 are coupled by a pin clevis joint 8. The joint 8 includes a pin 10, a tang 12 which extends axially from an end of the truss tube 4, and a shackle 14 which extends axially from an end of truss tube 6. The shackle 14 includes axially extending opposite side projections 15 and 17 which receive the tang 12 therebetween. Surfaces of the tang 12 and surfaces of the projections 15 and 17 of the shackle 14 do not contact each other.

A tapered bore extends transversely through the two projections 15 and 17 of the shackle 14 and defines two conically shaped and aligned surfaces 15a and 17a in the two projections 15 and 17, respectively, of the shackle 14. The tang 12 has a tapered bore extending transversely therethrough which defines a conically shaped surface 12a in the tang 12. The conically shaped surfaces 12a, 15a and 17a have an equal angle of slope and are arranged to form a substantially continuous cone-shaped bore for receiving the pin 10. These surfaces are made by standard machining practices and therefor can be made less expensively than existing space-quality pin clevis joints.

The pin 10 has a headed end 18 and an opposite, threaded end 20. A tapered, conically shaped sidewall 22 extends between the headed end 18 and the threaded end 20. The angle of slope of the conically shaped sidewall 22 is equal to that of the surfaces 12a, 15a and 17a, such that when the pin is inserted transversely through the two projections 15 and 17, an exact, precision fit is made between contacting surfaces of the pin 10, the projections 15 and 17, and the tang 12. The angle of slope shared by sidewall 22 and surfaces 12a, 15a and 17a is preferably about 6°, measured from a centerline of the pin 10 or axis of the conically shaped bore. An included angle of 12° would include the 6° angle on both sides of the centerline. Tapers of smaller angle, such as about 3° included angle, have been used in the past in machine tool designs and operations. These include the "morse" taper, the "jarno" taper, the "jacobs" taper, etc. Components with these small angle tapers are designed typically to lock or cease when axial loads are applied and are therefore unacceptable for use in applications where the component must rotate freely against the tapered pin, such as in the case of deployable space structures.

In order to maintain the precision, zero-play fit between the pin 10, the tang 12, and the shackle 14, two separate spring means are provided. The first spring means 26 is provided between a nut 24 which is threaded onto the threaded end 20 of the pin 10, and an outer surface of projection 15. The spring means 26 biases the pin 10 onto the conically shaped surfaces 15a and 17a of the projections 15 and 17. Thus, the tapered pin 10 is held in the clevis shackle 14 and is thereby prevented from moving radially. Also, due to the exact fitting between the conically shaped sidewall 10a and the conically shaped surfaces 15a and 17a, the pin 10 is prevented from moving axially in the direction of the truss tube axis. The preferred spring means 26 is a spring washer, such as a curved spring washer, a wave washer, or a belleville washer which extends between the nut 24 and the projection 15 as a compression spring. The effect is to urge the pin 10 into a seated position on the conically shaped surfaces 15a and 17a of the projections 15 and 17.

A second spring means 28 is provided between an inner surface of the projection 15 and an outer surface of the tang 12. The spring means biases the tang 12 onto the sidewall 10a of the pin 10 in the same manner as the first spring means 26 biases the pin 10 onto the conically shaped surfaces 15a and 17a. The second spring means 28 is also preferably a spring washer such as a curved spring washer, a wave washer, or a belleville washer. If higher angles of taper than about 6° are to be used, the joint will require spring washers having higher loads to keep the various parts from moving radially and axially relative to each other.

The second spring means 28 is preferably recessed into the outer surface of the tang 12 and urges the tang 12 in a direction opposite the direction in which the pin 10 is urged by the first spring means 26. The direction of biasing for tang 12 is away from projection 15 and towards projection 17, so that the tang 12 seats on the conically shaped sidewall 10a of the pin 10.

Any suitable materials may be used for the truss tubes, so long as they are rigid. These materials may include metallic materials and composite materials. The end fittings may be made of titanium or steel, or other suitable materials.

If it is unnecessary for the pin 10 to rotate freely, the nut 24 may be drawn tight so as to flatten the spring washer 26. In this case, the spring washer 26 could be deleted or substituted with a non-spring washer.

The tang 12 may be integrally formed on the end of the truss tube 4, or may be formed as a part of an end fitting 30 which is mounted on an end of the truss tube 4. Similarly, shackle 14 may be integrally formed on an end of the truss tube 6 or may be formed as a part of an end fitting 32 which is mounted on the end of the truss tube 6. Each of the end fittings 30 and 32 may be provided with a body portion which is received in the end of the tube for interconnecting the end fittings with the tubes.

A deployable truss structure of the present invention includes multiple pin clevis joints, such as pin clevis joint 8 shown in FIGS. 1-3. The truss structure is an assembly of truss tubes, such as tubes 4 and 6 and can be assembled to various sizes and shapes. It is important to have zero free play in each joint 8 since free-play for each joint is multiplied by the number of joints involved. Since the number is large, frequently amounting to several hundred, a very slight amount of free-play in one joint is multiplied and becomes a significant problem.

It is important for joint stiffness efficiency that the taper angle of the holes exactly matches the taper of the pin 10 so that line or surface-to-surface contact is established along the pin 10, tang 12, and projections 15 and 17 of the shackle 14. Therefore, to effect a 12° included angle taper, a 12° reamer is used to ream the holes in the tang 12 and projections 15 and 17. The tapered pins 10 are ground on the same machine as that which ground the reamer without making any changes in setup operations in order to preserve the taper trueness.

An advantage is achieved according to the present invention in that controlled deployment forces, i.e., relatively low moments, are required for deployment. This is in contrast to previously used joints which relied on an interference fit to achieve zero free-play.

Another advantage to the present invention is that the joint automatically compensates for wear by the constant force provided by the spring washers. Therefore, deployable structures fabricated with these joints can be deployed and retracted (stowed) numerous times and will continue to have repeatable and predictable static and dynamic structural properties.

The many features and advantages of the present invention are apparent from the detailed specification, and thus, it is intended by the appended claims to cover all such features and advantages of the pin clevis joint which fall within the true spirit and scope of the invention. Further, since numerous modifications and changes will readily occur to those skilled in the art based upon the disclosure herein, it is not desired to limit the invention to the exact construction and operation illustrated and described. Accordingly, all suitable modifications and equivalents may be resorted to falling within the scope and the spirit of the invention.

What is claimed is:

1. A pin clevis joint for connecting first and second structural members of a deployable space structure, comprising:
   a substantially U-shaped shackle connected to an end of the first structural member, and having two opposite side, axially extending projections;
   a tapered bore extending transversely through the two projections of the shackle, the tapered bore forming two conically shaped and aligned surfaces in the two projections of the shackle;
   an axially extending tang connected to an end of the second structural member and having a tapered bore extending transversely therethrough, the tapered bore forming a conically shaped surface in the tang, the conically shaped surfaces of the two projections and the tang having an equal angle of slope and combining to form a substantially continuous cone-shaped bore for receiving a pin;
   said pin comprising a headed end, an opposite end, and a conically shaped sidewall tapering from the headed end to the opposite end, the conically shaped sidewall having an angle of slope equal to the angle of slope for the conically shaped surfaces of the two projections of the shackle and the tang, the pin passing through the tapered bores of the tang and shackle and fitting precisely therein with substantially zero free-play;
   fastener means connectable to the opposite end of the pin;
   first spring means for biasing the pin onto the conically shaped surfaces of the two projections of the shackle; and
   second spring means for biasing the tang onto the sidewall of the pin.

2. A pin clevis joint according to claim 1, wherein the slope of the conically shaped surfaces of the two projections and the tang, and the conically shaped sidewall of the pin is an included angle of about 12°.

3. A pin clevis joint according to claim 1, wherein the first and second structural members are first and second truss tubes, and the pin clevis joint further comprises first and second end fittings respectively fitted on the ends of the first and second truss tubes, the tang being integrally formed with one of the two end fittings and the shackle being integrally formed with the other of the two end fittings.

4. A pin clevis joint according to claim 1, wherein the opposite end of the pin is threaded and the fastener means comprises a nut threadedly engaging the threaded end of the pin.

5. A pin clevis joint according to claim 4, wherein the first spring means comprises a spring washer disposed between an outer surface of one of the two projections and an inner surface of the nut.

6. A pin clevis joint according to claim 1, wherein the first and second spring means comprise spring washers.

7. A pin clevis joint according to claim 1, wherein the second spring means comprises a spring washer disposed between the tang and one of the two projections of the shackle.

8. A pin clevis joint according to claim 7, wherein the spring washer is recessed in a surface of the tang.

9. A pin clevis joint according to claim 1, wherein the first spring means comprises a spring washer disposed between an outer surface of one of the two projections and the fastener means.

10. A pin clevis joint according to claim 1, wherein the tapered bore tapers towards the fastener means, the first spring means biases the tang in a direction opposite the taper, and the second spring means biases the pin in a direction of the taper.

11. A deployable truss structure for use in outer space comprising:
    a plurality of truss tubes, and
    a plurality of pin clevis joints, each clevis joint comprising;
    a substantially U-shaped shackle connected to an end of a first truss tube, and having two opposite side, axially extending projections;
    a tapered bore extending transversely through the two projections of the shackle and forming two conically shaped and aligned surfaces in the two projections of the shackle;
    an axially extending tang connected to an end of a second truss tube and having a tapered bore extending transversely therethrough, the tapered bore defining a conically shaped surface in the tang, the tang being fitted between the two projections of the shackle, the conically shaped surfaces of the two projections of the shackle, the conically shaped surfaces of the two projections and the tang being aligned and having an equal angle of slope, and combining to form a substantially continuous cone-shaped bore for receiving a pin;
    said pin comprising a headed end, an opposite end, and a conically shaped sidewall tapering from the headed end to the opposite end, the conically shaped sidewall having an angle of slope equal to the angle of slope for the conically shaped surfaces of the two projections of the shackle and the tang, the pin passing through the tapered bores of the tang and shackle and fitting precisely therein with substantially zero free-play;
    fastener means connected to the opposite end of the pin;
    first spring means for biasing the pin onto the conically shaped surfaces of the two projections of the shackle; and
    second spring means for biasing the tang onto the sidewall of the pin.

12. A deployable truss structure according to claim 11, wherein the slope of the conically shaped surfaces of the two projections and the tang, and the conically shaped sidewall of the pin is an included angle of about 12°.

13. A deployable truss structure according to claim 11, wherein the pin clevis joint further comprises first and second end fittings respectively fitted in the ends of the first and second truss tubes, the tang being integrally formed with one of the two end fittings and the shackle being integrally formed with the other of the two end fittings.

14. A deployable truss structure according to claim 11, wherein the opposite end of the pin is threaded and the fastener means comprises a nut threadedly engaging the threaded end of the pin.

15. A deployable truss structure according to claim 14, wherein the first spring means comprises a spring washer disposed between an outer surface of one of the two projections and an inner surface of the nut.

16. A deployable truss structure according to claim 11, wherein the first and second spring means comprise spring washers.

17. A deployable truss structure according to claim 11, wherein the second spring means comprises a spring washer disposed between the tang and one of the two projections of the shackle.

18. A deployable truss structure according to claim 17, wherein the spring washer is recessed in a surface of the tang.

19. A deployable truss structure according to claim 11, wherein the first spring means comprises a spring washer disposed between an outer surface of one of the two projections and the fastener means.

20. A deployable truss structure according to claim 11, wherein the tapered bore tapers towards the fastener means, the first spring means biases the tang in a direction opposite the taper, and the second spring means biases the pin in a direction of the taper.

* * * * *